United States Patent [19]
Esken

[11] Patent Number: 6,101,933
[45] Date of Patent: Aug. 15, 2000

[54] BALER WITH ADJUSTABLE BALE DENSITIES

[75] Inventor: Dirk Esken, Soest-Meckingsen, Germany

[73] Assignee: Usines Claas France, Woippy, France

[21] Appl. No.: 09/375,930

[22] Filed: Aug. 17, 1999

[30] Foreign Application Priority Data

Aug. 18, 1998 [DE] Germany ............... 298 14 775 U

[51] Int. Cl.[7] ............................................. B30B 3/04
[52] U.S. Cl. ........................................ 100/89; 56/341
[58] Field of Search ........................... 100/87, 88, 89, 100/5, 191; 56/341

[56] References Cited

U.S. PATENT DOCUMENTS

| | | | |
|---|---|---|---|
| 4,137,697 | 2/1979 | Knapp et al. | 100/88 |
| 4,280,320 | 7/1981 | Eggers | 100/88 |
| 4,698,955 | 10/1987 | Wagstaff | 56/341 |
| 5,367,865 | 11/1994 | Jennings et al. | 56/341 |
| 5,875,709 | 3/1999 | Tertilt | 100/89 |

*Primary Examiner*—Peter Vo
*Assistant Examiner*—Louis G. Huynh
*Attorney, Agent, or Firm*—Husch & Eppenberger, LLC; Robert E. Muir

[57] ABSTRACT

Round balers include bale shaping elements which define the boundary of the bale forming chamber. One part of the bale shaping elements can be swung by an attached structural arm into the bale forming chamber. The amount the elements are swung into the chamber is defined by the tensional forces on a spring. These tensional forces can be manually adjusted using a device, in a stepwise manner. One embodiment includes a handheld lever and a stepped shift-gate.

7 Claims, 3 Drawing Sheets

BALER WITH ADJUSTABLE BALE DENSITIES

BACKGROUND OF THE INVENTION

The present invention relates generally to agricultural machinery and, more particularly, to improvements to balers for harvested crops.

Round balers have a bale forming chamber defined by bale shaping elements. Two or more of the bale shaping elements are mounted on a structural arm, which can be swung into the chamber. The bale shaping elements determine the density of the bale. These balers are not able to produce bales of varying bale densities.

An objective of this invention is to produce bales at varying bale densities.

Another objective is to provide a handheld device to adjust manually the bale density mechanism.

SUMMARY OF THE INVENTION

In accordance with the present invention there is provided a round baler for baling harvested crops having a bale forming chamber defined by bale shaping elements, the bale shaping elements being mounted on a structural arm which can be swung into the chamber, a spring with a tensional force which defines the amount the structural arm is swung into the chamber, and a device, associated with the spring, for manually adjusting the primary tension of the spring in a stepwise manner.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
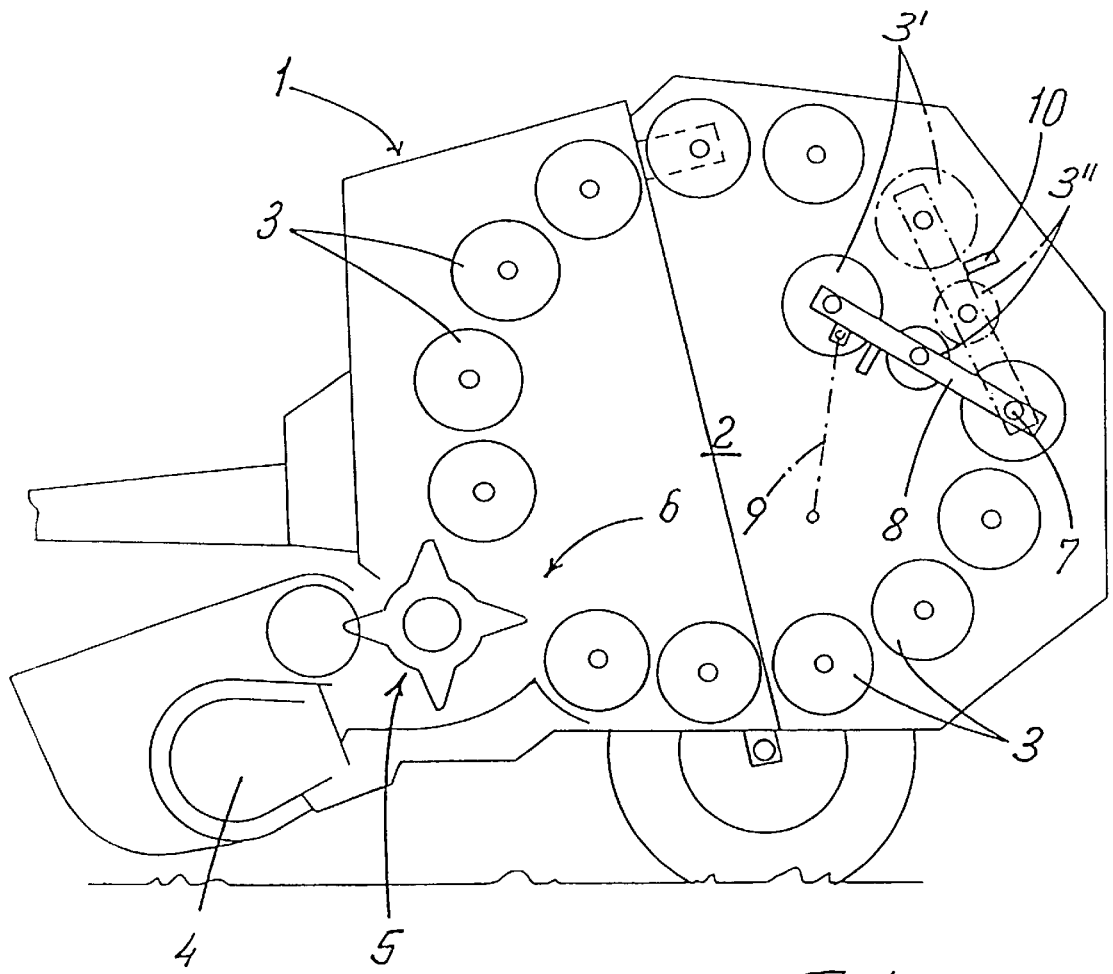
FIG. 1 shows a schematically illustrated side view of a round baler.

A round baler 1 for harvested crops comprises a bale forming chamber 2 bounded by bale shaping elements 3, a structural arm 8 attached to one part of the bale shaping elements, a spring 9 which defines how much the structural arm will swing into the chamber, and a device 12 for manually adjusting the tension on the spring, in a stepwise manner. The bale shaping elements are advantageously in the form of driven cylindrical rollers 3. The harvested crops are received by the pick-up drum 4 and are fed into the bale forming chamber 2 through the feed opening 6. If necessary, the crop materials may pass through a cutter device 5 before passing through the feed opening 6. Two or more smooth or profiled rollers 3',3" can be swung into the bale forming chamber 2 by means of a structural arm 8, pivotal about the axis of the rollers. These rollers 3', 3" serve to define a peripheral boundary of the bale forming chamber 2. The structural arm 8 is subject to the effects of a tension spring 9, and its degree of freedom is limited by upper and lower stops 10, 11. When the structural arm 8 is swung inwardly, the rollers 3',3" divert the forward path of the material being baled. As soon as a sufficient amount of material has been collected together and the appropriate bale density has been reached, the structural arm 8 is raised up to the upper stop 10 against the force of the spring 9.

Figure 2:
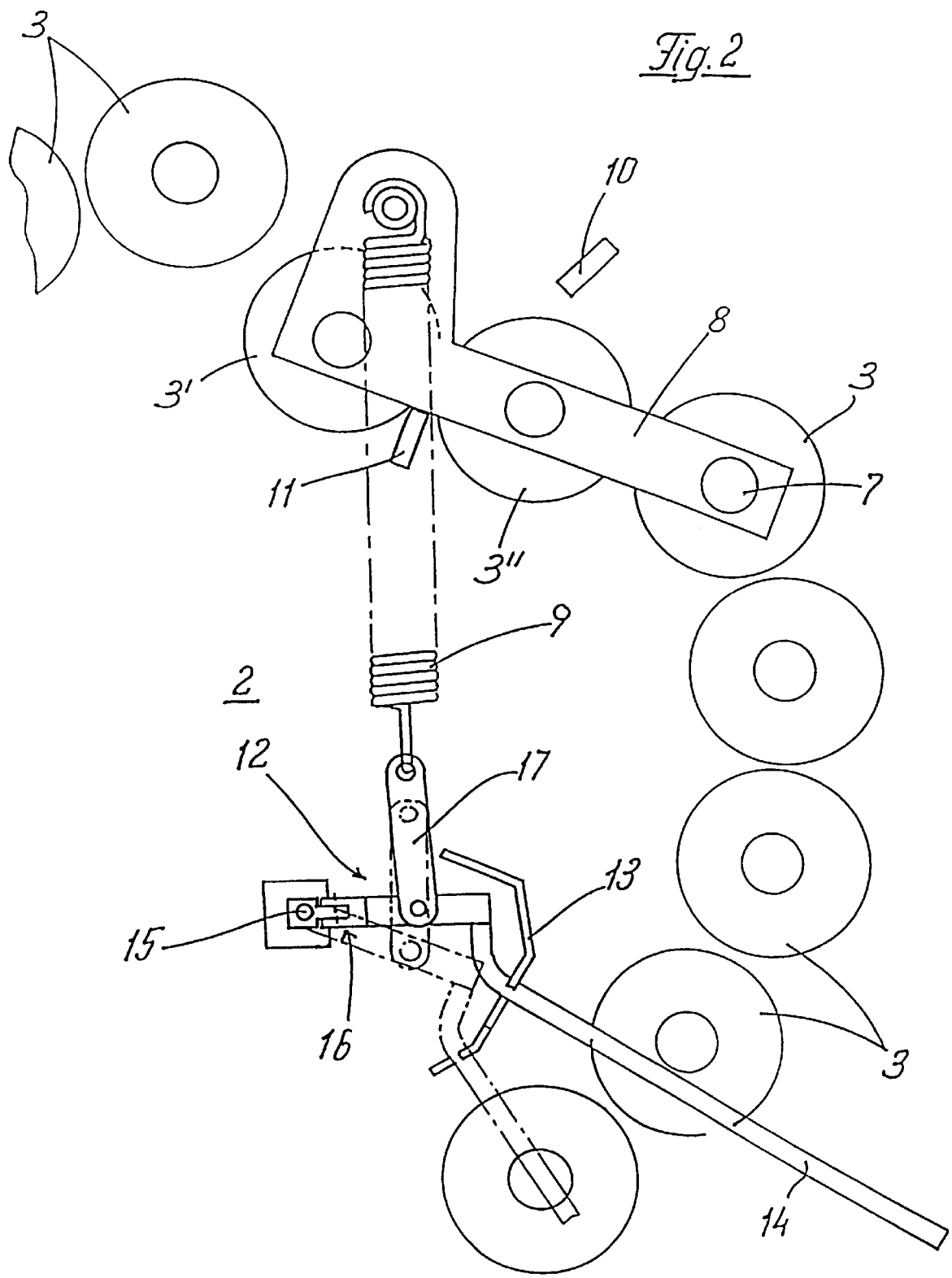
FIG. 2 is a side view of a version of the device for adjusting the tension of the spring.
Figure 3:
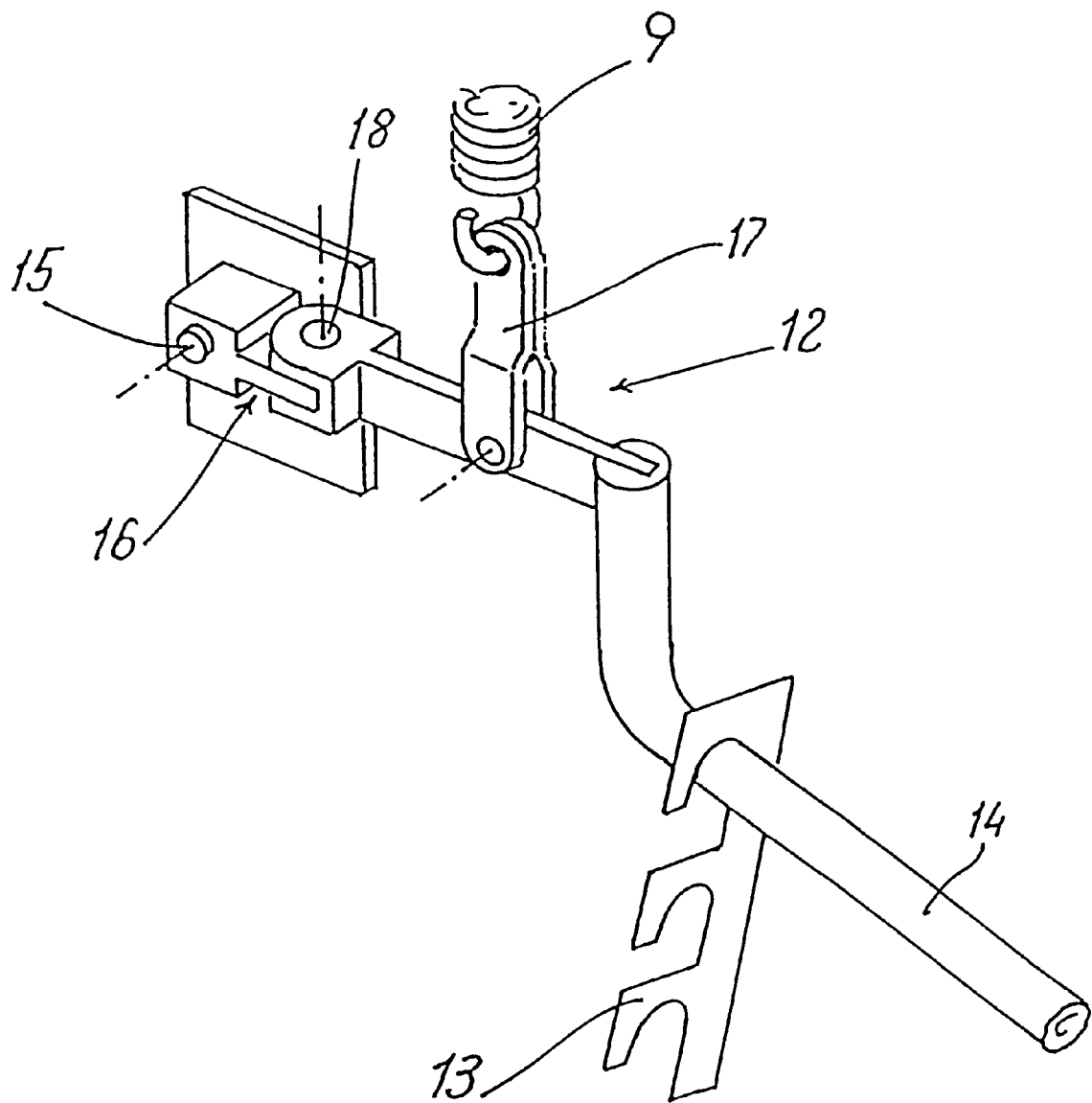
FIG. 3 is a perspective view of the version of the device shown in FIG. 2.

The strength of the tension spring 9 is advantageously altered by means of a manually operable pre-tensioning device 12. One embodiment of the device 12 consists of a handheld lever 14 which can be locked at different positions in a stepped shift-gate 13. The lever 14 can be pivoted vertically about a horizontal axis 15 in conjunction with a universal joint 16 and the lever 14 is articulated to the spring 9 by a tie strap 17 as shown in FIGS. 2 and 3. The universal joint 16 is pivotally mounted on the machine, conveniently on its frame. The joint 16 pivots about the axis 15 and also allows the handheld lever 14 to pivot horizontally sideways about a vertical axis 18. This latter action is necessary in order to allow the handheld lever 14 to be disengaged from the different retaining steps in the shift-gate 13 and to be locked in a new retaining step. Other arrangements may be utilized to allow disengagement and subsequent adjustment and reengagement.

Crop bales of differing bale density can be produced by varying the tensions of I-the spring 9. The particular tension applied determines the time point at which the pivotal structural arm 8, carrying the shaping rollers 3',3", is swung toward the peripheral end point.

The invention is not restricted to the embodiment described above. Thus, not only may cylindrical rollers 3 be used as the bale forming elements, but mutually adjacent strips or the like could be used for defining the boundary of the bale chamber, without departing from the fundamental principle of a partial inward movement into the bale forming chamber 2.

Other objects, features and advantages will be apparent to those skilled in the art. While a preferred embodiment of the present invention have been illustrated and described, this has been by way of illustration and the invention should not be limited except as required by the scope of the appended claims.

I claim:

1. In a round baler having a bale forming chamber, bounded by a plurality of bale shaping elements; a structural arm on which a section of the bale shaping elements is mounted, means for mounting the structural arm so it can be swung into the bale forming chamber; a spring having a primary tension force which defines the amount the structural arm can be swung into the bale forming chamber; the improvement comprising:

a device, associated with the spring, for manually adjusting the primary tension of the spring in a stepwise manner;

the device including a handheld pivoting lever associated with the spring; and a stepped-shift gate, associated with the lever.

2. A round baler according to claim 1, wherein the shift-gate comprises a plurality of retaining slots, wherein the slots retain the lever at spaced intervals.

3. A round baler according to claim 1, wherein the device for adjusting the primary tension of the spring includes a universal joint connected to a frame of the chamber and associated with the lever so that the lever can pivot laterally about a vertical axis.

4. A round baler according to claim 3, wherein the universal joint is connected to the frame via a horizontal pivotal axis, providing for vertical movement of the lever.

5. A round baler according to claim 1, including a frame and wherein the device for adjusting the primary tension of the spring comprises a tie strap operatively connected to the spring; and wherein the handheld pivoting lever is associated with the tie strap; and including a universal joint operatively connected to the frame and associated with the lever.

6. The round baler of claim 5, wherein the tie strap connects the lever and the spring in an articulated manner.

7. The round baler of claim 6, wherein the tie strap connects the lever and the spring at a point on a general line between the universal joint and the shift-gate.

* * * * *